Dec. 22, 1959    A. L. SCOTT ET AL    2,918,104
APPARATUS AND METHOD FOR PRODUCING TAPERED GLASS RODS
Filed July 5, 1957    4 Sheets-Sheet 1
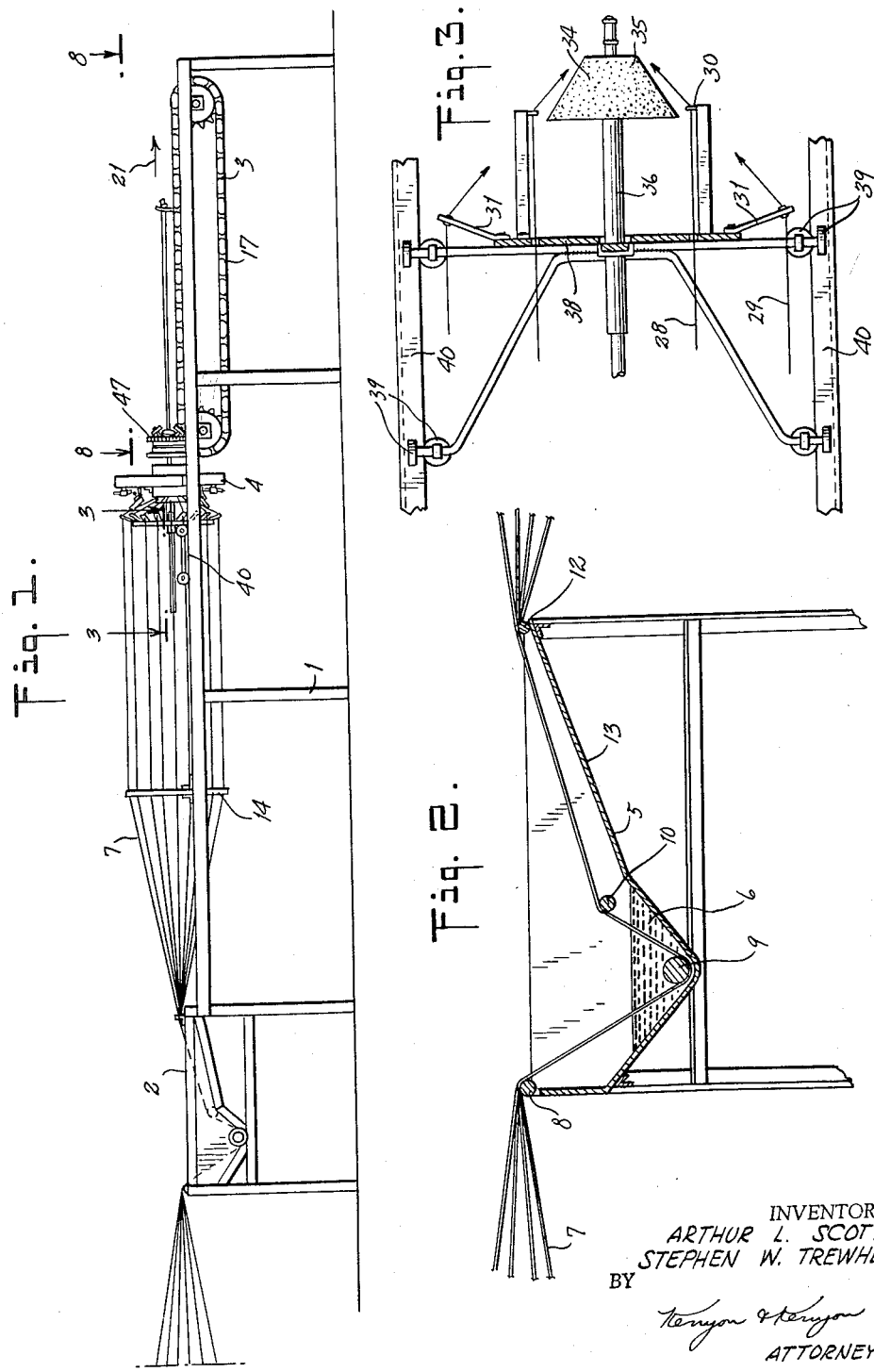
INVENTORS
ARTHUR L. SCOTT
STEPHEN W. TREWHELLA
BY
Kenyon & Kenyon
ATTORNEYS

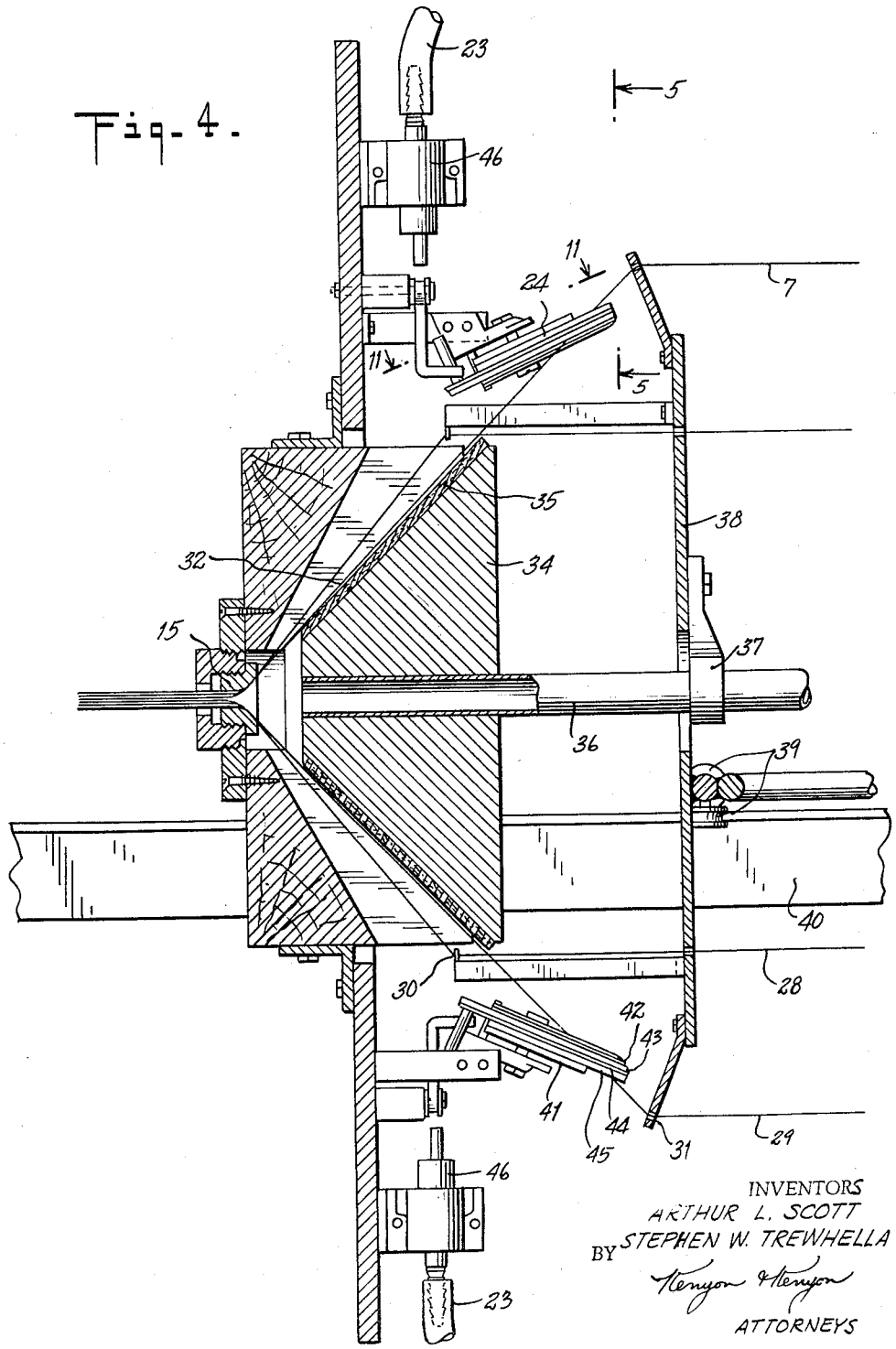

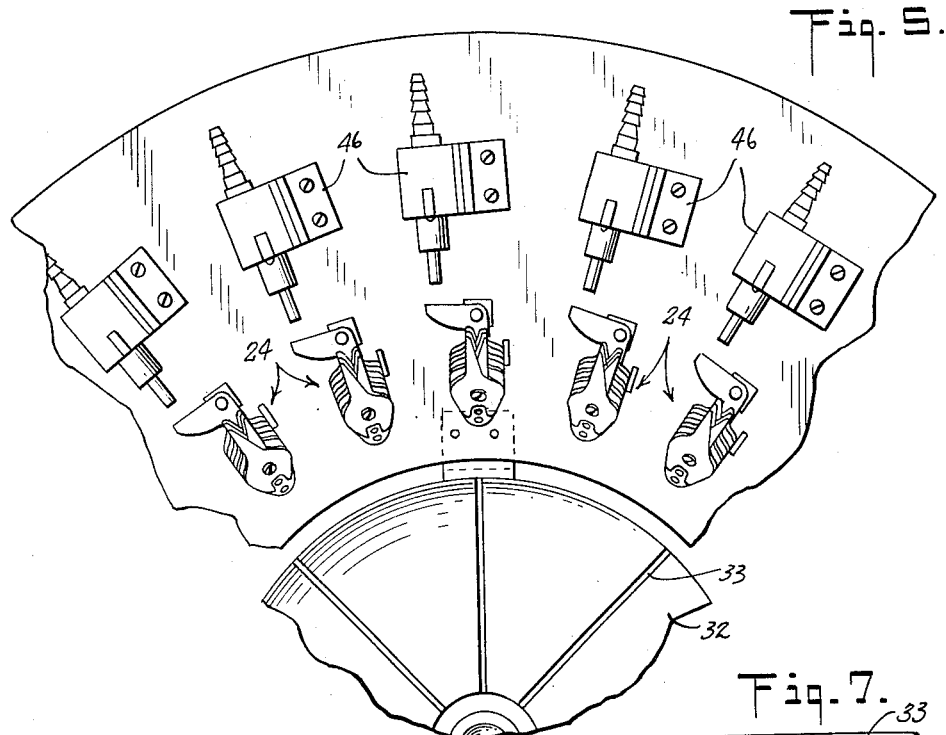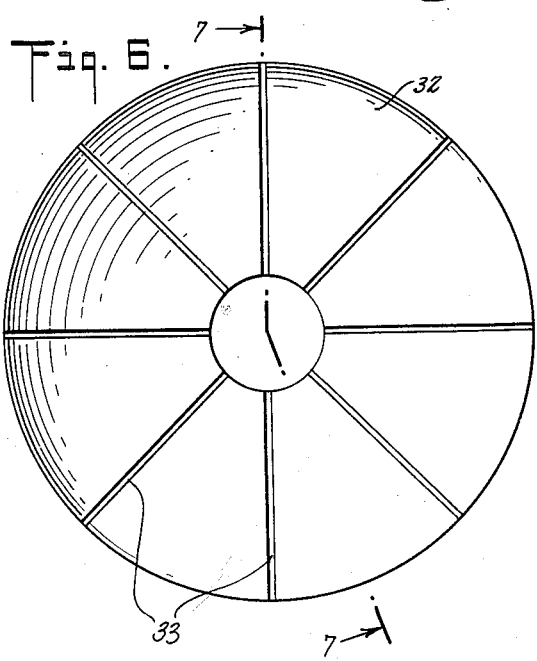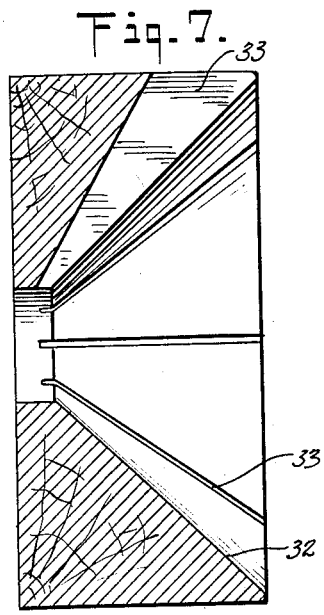

Dec. 22, 1959  A. L. SCOTT ET AL  2,918,104
APPARATUS AND METHOD FOR PRODUCING TAPERED GLASS RODS
Filed July 5, 1957  4 Sheets-Sheet 4
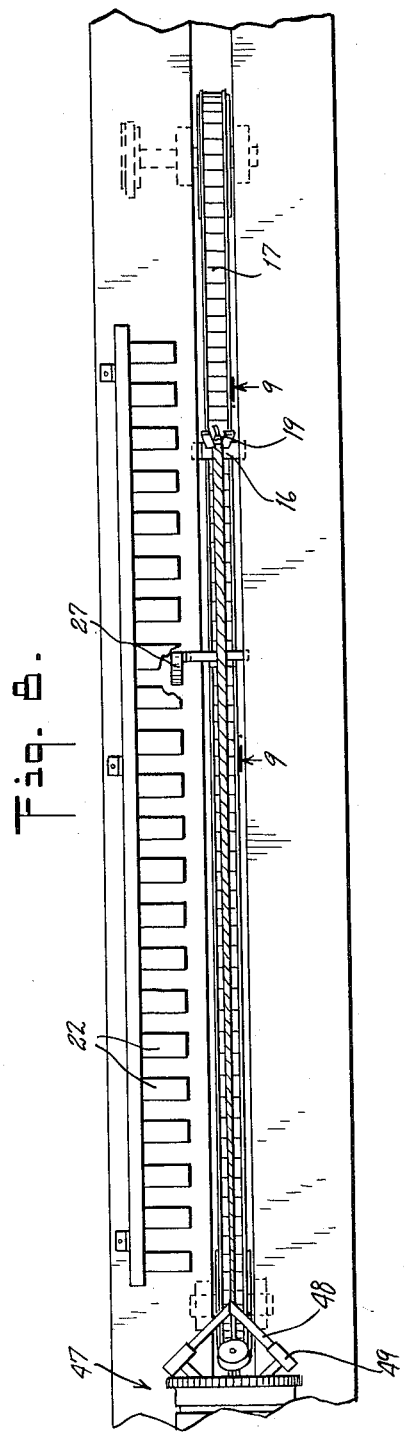
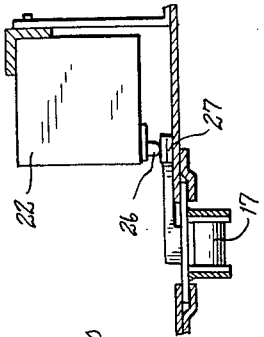
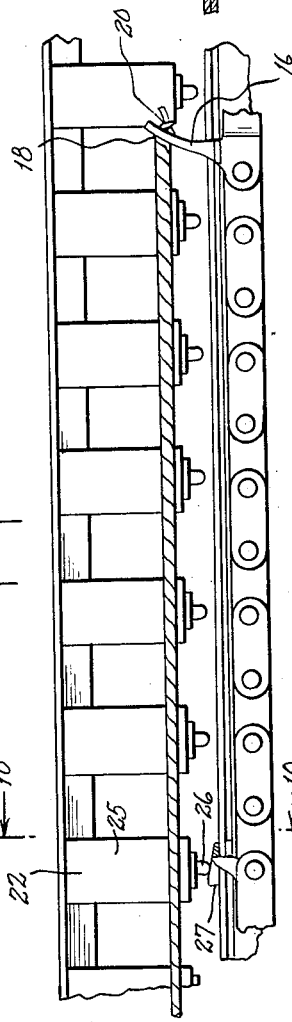
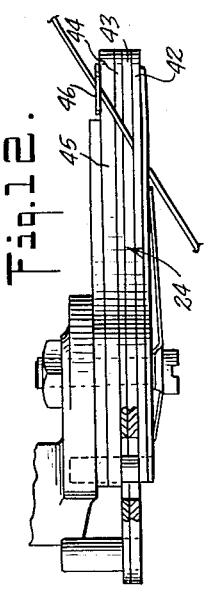
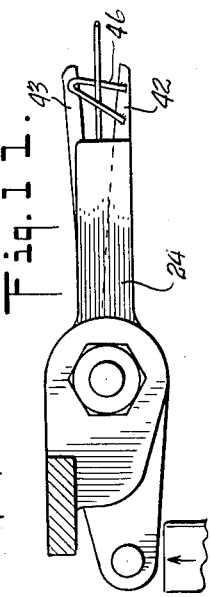
INVENTORS
ARTHUR L. SCOTT
STEPHEN W. TREWHELLA
BY
Kenyon & Kenyon
ATTORNEYS United States Patent Office 2,918,104
Patented Dec. 22, 1959

2,918,104

APPARATUS AND METHOD FOR PRODUCING TAPERED GLASS RODS

Arthur L. Scott and Stephen W. Trewhella, Columbia, S.C., assignors to Columbia Products Company, Columbia, S.C., a corporation of South Carolina Application July 5, 1957, Serial No. 670,001

13 Claims. (Cl. 154—1.7)

This invention relates to a method and apparatus for forming fiberglass rods particularly suited for forming tapered rods.

One of the objects of the invention is to provide new apparatus and method for making such rods in which, although the rod is tapered, the fibers making up the outer surface of the rod and forming the principal tension members all extend the full length of the rod.

Another object of the invention is to provide such a machine which automatically controls the taper of the rod.

Another object of the invention is to provide such a machine and method which has flexibility and can be set to produce rods of varying taper.

Other objects and advantages of the invention will be apparent from the description of the invention and from the drawings, in which—

Fig. 1 is a side elevation of a machine embodying the invention and suitable for carrying out the method;

Fig. 2 is a detailed view, partly in section, showing how the plastic which binds the fibers together may be applied to the fibers;

Fig. 3 is a detailed sectional view showing portions of the machine taken on the line 3—3 of Fig. 1;

Fig. 4 is a detailed sectional view showing the forming die and associated apparatus;

Fig. 5 is a detailed view showing the disposition of the cutoff means and the actuators therefor;

Fig. 6 is a detailed view looking into the female conical member through which the slivers of glass are fed;

Fig. 7 is a detailed sectional view taken on the line 7—7 of Fig. 6;

Fig. 8 is a top plan view of the righthand portion of the machine as viewed in Fig. 1 showing the feeding mechanism for the glass fiber shaft;

Fig. 9 is a detailed sectional view taken on the line 9—9 of Fig. 8;

Fig. 10 is a detailed sectional view taken on the line 10—10 of Fig. 9;

Fig. 11 is a top plan view of one of the cutoff means; and

Fig. 12 is a front view of the cutoff means.

The invention consists generally of a forming die and means for pulling a plurality of glass fibers through the die and guiding means disposed adjacent the die adapted to guide one group of slivers of glass fibers to the die in such a way as to form the outer circumferential shell of the rod and guiding means adapted to guide other slivers of fibers to form part of the central portion of the rod and means disposed to sever individual slivers as the feeding progresses so as to reduce the bulk of the individual portion of the rod and thus cause it to taper while maintaining the outer shell as continuous fibers extending from end to end of the rod.

Automatic means are provided for actuating the cutoff members which cut the slivers of fibers which go to the inside of the rod. These means are actuated by means carried by the mechanism which pulls the glass fibers through the rod. Pneumatic means are preferably employed.

The machine consists essentially of a base 1, a section 2 for coating the glass fibers, a section 3 for advancing the glass fibers, and a section 4 for guiding the glass fibers and forming them into a rod.

The section in which the fibers are coated consists of a tank 5 in which is kept liquid heat-setting synthetic resinous material of the type generally employed for securing glass fibers together to form rods or the like, which is indicated at 6. The glass fibers are fed in slivers 7 from suitable spools or other sources of supply. Each sliver consists of a plurality of individual glass fibers which are quite fine individually. These are fed over a roller 8, under a roller 9 which is immersed in the resinous coating material, over a roller 10 and thence over a roller 12 which is disposed adjacent the apron 13 arranged to receive material dripped from the slivers of glass as they are advanced. The slivers of glass then pass through a ring 14 having a plurality of guides for the individual slivers. These guides hold the fibers in a circumferentially disposed arrangement about the axis of the machine. The slivers of fibers 7 then pass through suitable guide means in the forming section and through a forming die 15 where they are formed into a rod. The ends project through the forming die and there engage a pulling member or fork 16 which is incorporated in a suitable link chain 17 and consists of an upwardly projecting fork 18 having a tapered notch 19 which is adapted to receive a suitable knot 20 which is formed in the ends of the fibers. This knot may be best formed by bunching the fibers together and then heating them with a suitable pair of heated jaws to set the resin which coats the fibers.

The fibers are advanced through the machine through the pulling action of the fork which moves in the direction of the arrow 21 in Fig. 1.

Disposed alongside the chain 17 are a series of control valves 22, each of which is connected through a suitable tubular connection 23 to an actuator for the cut-off members 24 which will be described in greater detail later on in the specification. Each of these valves consists of a cylindrical portion 25 and an actuator 26 which may be pressed inwardly into the cylinder. A cam 27 which is carried by the chain 17 is disposed to move in a path directly adjacent the actuators 26 and as it engages said actuators force them inwardly to control the operation of the cutoff members for a purpose to be described later. Thus, as the chain 17 advances along the direction of the arrow 21 of Fig. 1, the cutoff members are actuated serially in any desired order.

The slivers of glass fibers 7 are divided into two groups. Those shown at 28 form the outer surface of the rod and those shown at 29 go to form up the inner portion of the rod.

The slivers 28 pass through guides 30 which are disposed circumferentially around the forming die 15 and are spaced outwardly from the axis of the machine so that the slivers 28 enter the die at an angle acute to the axis of the machine. These outer fibers formed by the slivers 28 are maintained under suitable tension throughout the entire feeding and load-forming operation so that they are maintained in contact with the outer surface of the forming die 15.

The slivers 29 pass through a circumferentially disposed group of guides 31 which are disposed circumferentially of the axis and outwardly from the forming die but farther from the forming die than the guides 30 so that the slivers 29 enter the forming die at an angle which is more acute than the angle at which the slivers 28 enter the forming die.

There is disposed around the forming die a conical female frictional gripping member 32 in which the angle of the walls corresponds generally to the angle at which the slivers 29 enter the forming die 15. In order to permit the slivers 28 to move unimpededly to the forming die, the member 32 is provided with a series of grooves 33 which are in line with the guides 30 and serve as passageways for the slivers 28 on the way to the forming die 15. A cooperating male conical frictional clamping member 34 is provided fitted within the female conical gripping member 32. This member is provided with a face 35 of felt or some suitable material adapted to provide a yielding gripping surface in cooperation with the female member 32.

The slivers 29 pass between the conical surface of the member 32 and the member 34 and are thus maintained under some tension and are kept straight and untangled as they pass to the forming die 15.

The member 34 is mounted on a tube 36 which is fixed in a member 37 which along with the guides 30 and 31 are all mounted on a carriage 38 mounted on rollers 39 resting on a track 40 so that the entire assembly may be moved either to retract the conical member 34 from the conical member 32 or to move it into clamping relationship therewith.

The entire support is moved rearwardly when it is desired to start a new rod in a manner which will be hereafter explained more fully.

The slivers 29 each pass through a cutoff which consist of a fixed shear 42, a movable shear 43, a movable member 44 which is coupled to move with the movable shear 43, and a member 45 which is fixed but which cooperates with the fiber member 44 to clamp the end of a sliver 29 when the shear operates to sever that particular sliver. A guiding loop 46 for the sliver is also provided.

Each of the shears is provided with an operating cylinder 46 which is connected by the hose 23 to one of the control valves 22.

It will be seen that as the chain 17 advances in the direction of the arrow 21 shown in Fig. 1, the cam 27 will successively actuate the cutoff members 41 so that as the feeding progresses step by step one or more of the slivers 29 is severed. This reduces the bulk of the fiberglass going to the center portion of the cord and provides a taper which is covered, however, through the length of the rod by the glass fiber from slivers 28 which form a continuous outer sheath of glass fiber extending the full length of the rod section.

The glass fibers as they pass from the forming die are wrapped by a suitable wrapping mechanism 47 with a plurality of strips of cellophane 48 which are fed from reels 49. This cellophane is kept in place until the rod section has been cured and the resin set by heating. Thereafter it is removed.

In operation the machine is preset for a given taper by adjusting the position of the cylinders 22 to determine at what point in the feeding the individual cutoff members will be actuated. After a rod section has been formed the supporting slide 38 is moved away from the die. The operator of the machine then gathers together all of the slivers 28 and the ends of the slivers 29 and secures them together. The severed ends of the slivers 29 are held between the fiber member 44 and the fixed member 45 so that they are conveniently positioned for this operation. The slivers are threaded through the forming die and the end is secured to the member 18, as heretofore described. The machine is then started and the feeding proceeds as indicated above. If it is desired to insert a core in the rod the core is inserted through the tube 36 and is pulled along by the fibers.

It will be appreciated that the aforesaid machine and the operation thereof have been shown and described to illustrate the invention. It will be appreciated that other forms of machine can be used and that the above description is by way of illustration and is in no way intended to serve as a limitation as to the scope of the invention which is limited only by the appended claims.

We claim:

1. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, a female conical member surrounding the entrance to said die having a conical face disposed to engage the slivers of said second group, said conical female member having spaced slots alined between the guides of said first group and said die for the passage of the slivers of said first group, a conical male member having a felt conical face adapted to fit against the conical face of said conical female member to supply a frictional drag to the slivers of said second group as they pass between said conical members, cutoff members disposed between the guides of said second set and said die, each being positioned to sever a sliver of said second group and each having an individual control therefor and means associated with said pulling means to actuate said control means seriatim as said pulling means moves away from said die.

2. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, a female conical member surrounding the entrance to said die having a conical face disposed to engage the slivers of said second group, said conical female member having spaced slots alined between the guides of said first group and said die for the passage of the slivers of said first group, a conical male member having a felt conical face adapted to fit against the conical face of said conical female member to supply a frictional drag to the slivers of said second group as they pass between said conical members, and means for severing the slivers of said second group seriatim.

3. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die, a female conical member surrounding the entrance to said die having a conical face disposed to engage the slivers of said second group, said conical female member having spaced slots alined between the guides of said first group and said die for the passage of the slivers of said first group, a conical male member having a felt conical face adapted to fit against the conical face of said conical female member to supply a frictional drag to the slivers of said second group as they pass between said conical members, cutoff members disposed between the guides of said second set and said die, each being positioned to sever a sliver of said second group and each having an individual control therefor and means associated with said pulling means to actuate said control means seriatim as said pulling means moves away from said die.

4. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die, a female conical member surrounding the entrance to said die having a conical face disposed to engage the slivers of said second group, said conical female member having spaced slots alined between the guides of said first group and said die for the passage of the slivers of said first group, a conical male member having a felt conical face adapted to fit against the conical face of said conical female member to supply a frictional drag to the slivers of said second group as they pass between said conical members and means for severing the slivers of said second group seriatim.

5. The method of forming a tapered fiberglass rod having a peripheral layer of glass fibers extending the full length of said rod comprising simultaneously feeding a plurality of slivers of glass fibers from two groups of such slivers axially through a die and compacting said fibers to rod form and adhesively securing them together, the slivers from one group forming the peripheral layer of glass being fed to said die from a plurality of points circumferentially disposed laterally of said die and entering said die at an angle acute to the axis of feeding and being maintained under tension throughout the operation whereby they are maintained at the periphery of the finished rod, the slivers of said other group forming an interior portion of said rod being fed to said die at an angle less acute to said axis than that at which said first group of slivers are fed, said slivers of said second group being severed individually and at spaced intervals as the feeding takes place whereby the bulk of said rod is progressively decreased as progressive feeding takes place, thus forming a taper.

6. The method of forming a tapered fiberglass rod having a peripheral layer of glass fibers extending the full length of said rod comprising simultaneously feeding a plurality of slivers of glass fibers from two groups of such slivers axially through a die and compacting said fibers to rod form and adhesively securing them together, the slivers from one group forming the peripheral layer of glass being fed to said die from a plurality of points circumferentially disposed laterally of said die and entering said die at an angle acute to the axis of feeding and being maintained under tension throughout the operation whereby they are maintained at the periphery of the finished rod, the slivers of said other group forming an interior portion of said rod being severed individually and at spaced intervals as the feeding takes place whereby the bulk of said rod is progressively decreased as progressive feeding takes place, thus forming a taper.

7. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, a female conical member surrounding the entrance to said die having a conical face disposed to engage the slivers of said second group, said conical female member having spaced slots alined between the guides of said first group and said die for the passage of the slivers of said first group, a conical male member having a felt conical face adapted to fit against the conical face of said conical female member to supply a frictional drag to the slivers of said second group as they pass between said conical members, cutoff members disposed between the guides of said second set and said die, each being positioned to sever a sliver of said second group, and each having an individual control therefor, the individual controls for said cutoff members being disposed in line adjacent said pulling means and means associated with said pulling means to actuate said control means seriatim as said pulling means moves away from said die, and a tubular member disposed axially of said male conical member to receive a core being fed through said machine.

8. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, a female conical member surrounding the entrance to said die having a conical face disposed to engage the slivers of said second group, said conical female member having spaced slots alined between the guides of said first group and said die for the passage of the slivers of said first group, a conical male member having a felt conical face adapted to fit against the conical face of said conical female member to supply a frictional drag to the slivers of said second group as they pass between said conical members, cutoff members disposed between the guides of said second set and said die, each being positioned to sever a sliver of said second group and each having an individual control therefor, the individual controls for said cutoff members being disposed in line adjacent said pulling means and means associated with said pulling means to actuate said control means seriatim as said pulling means moves away from said die.

9. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, gripping means disposed to supply a frictional drag to the slivers of said second group as they pass to said die, cutoff members disposed between the means for supplying and guiding said second set of slivers and said die, each being positioned to sever a sliver of said second group and each having an individual control means therefor, the individual controls for said cutoff members being disposed in line adjacent said pulling means and means associated with said pulling means to actuate said control means seriatim as said pulling means moves away from said die.

10. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, a female conical member surrounding the entrance to said die having a conical face disposed to engage the slivers of said second group, said conical female member having spaced slots alined between the guides of said first group and said die for the passage of the slivers of said first group, a conical male member having a felt conical face adapted to fit against the conical face of said conical female member to supply a frictional drag to the slivers of said second group as they pass between said conical members, cutoff members disposed between the guides of said second set and said die, each being positioned to sever a sliver of said second group and each having an individual control therefor and means to actuate said control means seriatim as said pulling means moves away from said die.

11. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, gripping means disposed to supply a frictional drag to the slivers of said second group as they pass to said die, cutoff members disposed between the means for supplying and guiding said second set of slivers and said die, each being positioned to sever a sliver of said second group and each having an individual control means therefor and means to actuate said control means seriatim as said pulling means moves away from said die.

12. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, a female conical member surrounding the entrance to said die having a conical face disposed to engage the slivers of said second group, said conical female member having spaced slots alined between the guides of said first group and said die for the passage of the slivers of said first group, a conical male member having a conical face adapted to fit against the conical face of said conical female member to supply a frictional drag to the slivers of said second group as they pass between said conical members, cutoff members disposed between the guides of said second set and said die, each being positioned to sever a sliver of said second group, and each having an individual control therefor, the individual controls for said cutoff members being disposed in line adjacent said pulling means and means associated with said pulling means to actuate said control means seriatim as said pulling means moves away from said die.

13. In apparatus for forming tapered rods from glass fibers or the like, the combination of a die having an inlet and an outlet, pulling means movable axially of said die for pulling a plurality of glass fibers through said die, means for supplying and guiding a first group of slivers of fibers to said die including a plurality of guides each adapted to guide a sliver of fibers, said guides being spaced and disposed circumferentially and adjacent the inlet to said die to guide slivers of said first group to said die at an angle acute to the axis of said die and for maintaining said slivers of said first group under tension throughout the operation of the apparatus, means for supplying a second group of slivers and guiding them to said die including a second set of guides each adapted to guide a sliver of fibers, spaced and circumferentially disposed adjacent the inlet to said die disposed to guide said slivers to said die at an angle more acute to the axis of said die than the angle of the feeding of said first group of slivers, a female conical member surrounding the entrance to said die having a conical face disposed to engage the slivers of said second group, said conical female member having spaced slots alined between the guides of said first group and said die for the passage of the slivers of said first group, a conical male member having a conical face adapted to fit against the conical face of said conical female member to supply a frictional drag to the slivers of said second group as they pass between said conical members, cutoff members disposed between the guides of said second set and said die, each being positioned to sever a sliver of said second group and means to actuate said control means seriatim as said pulling means moves away from said die.

References Cited in the file of this patent

UNITED STATES PATENTS

| | | |
|---|---|---|
| 1,944,464 | Richardson | Jan. 23, 1934 |
| 2,371,357 | Schindler | Mar. 13, 1945 |

FOREIGN PATENTS

| | | |
|---|---|---|
| 627,255 | Great Britain | Aug. 4, 1949 |